UNITED STATES PATENT OFFICE.

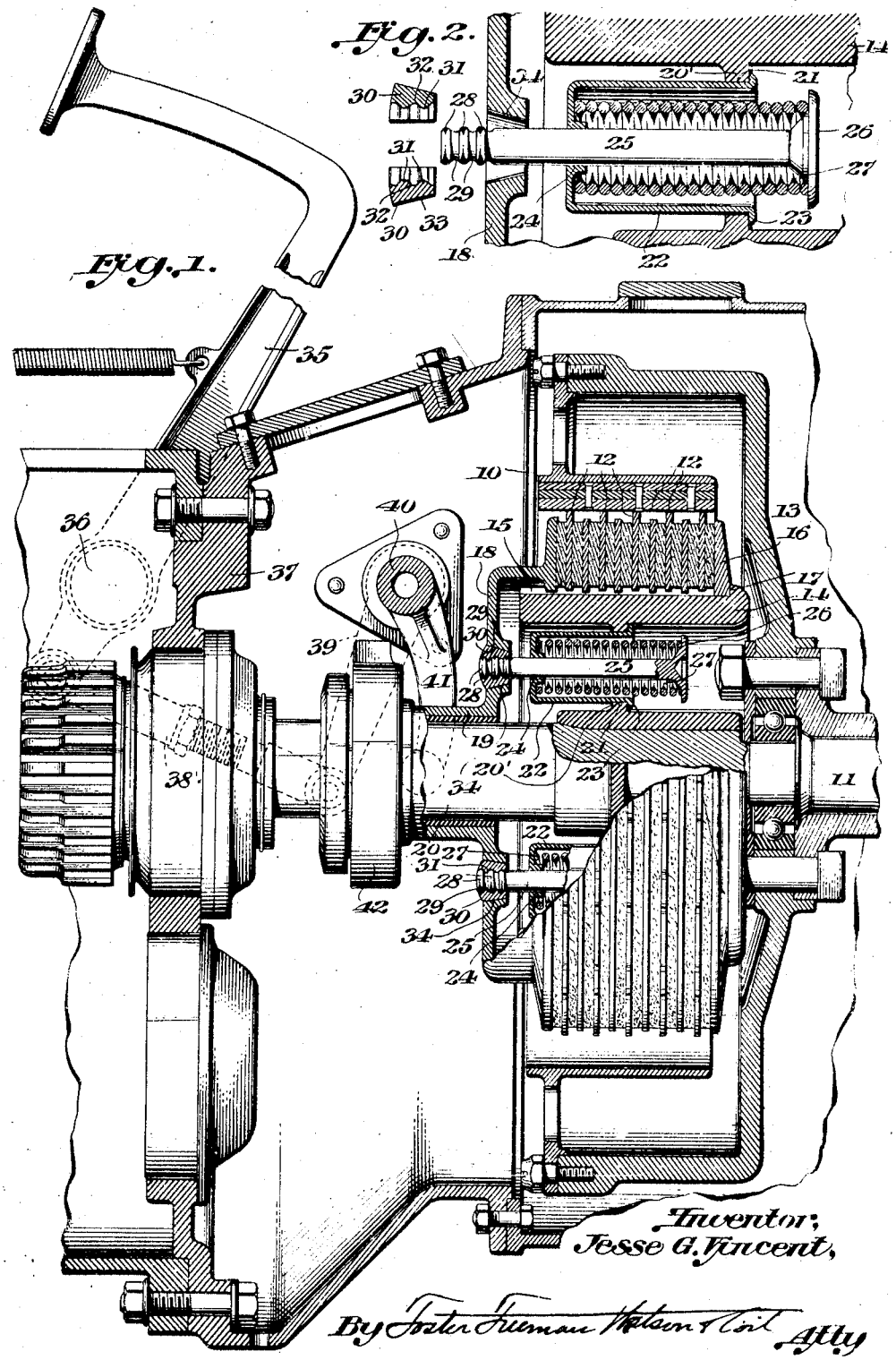

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

CLUTCH.

1,339,047.

Specification of Letters Patent.

Patented May 4, 1920.

Application filed July 22, 1918. Serial No. 246,178.

*To all whom it may concern:*

Be it known that I, JESSE G. VINCENT, a citizen of the United States, and residing at Detroit, Wayne county, State of Michigan, have invented certain new and useful Improvements in Clutches, of which the following is a specification.

The present invention relates to clutches and more particularly to an improved arrangement of the spring bolts thereof.

The principal object of the invention is to provide a means for securing the spring bolts against displacement due to the tension of the springs which is self locking, is quickly and easily assembled or taken apart, and requires less space axially of the clutch than the means heretofore used.

To these ends the improvement consists in combination with the other parts of the clutch, of a pin having an abutment at one end and a circular rib at the other, a split nut having an interior groove for the rib and disposed in an aperture in one of the clutch members, the nut and member being constructed to clamp the nut on the pin and hold the pin against endwise movement under the action of a spring acting on the said abutment.

The preferred construction and features of novelty will be apparent from the description taken in connection with the drawings, in which:—

Figure 1 is a longitudinal sectional elevation through a clutch, some of the parts being shown in elevation; and Fig. 2 is an enlarged sectional view of a detail illustrating the split nut removed from the spring bolt and the spring compressed.

Referring to the drawings it will be seen that the invention is illustrated as embodied in a multiple disk clutch. It is to be understood, however, that the invention is not limited to use in this type of clutch but may be employed in any type having a spring means for causing the engagement of the clutch members.

The clutch comprises a driving part 10 connected to the driving shaft 11 and having a series of disks 12 connected to rotate therewith but mounted for sliding movement in an axial direction. Alternating with the disks 12 are a series of disks 13 mounted on a head or spider 14, for rotation therewith and axial movement relative thereto. For this purpose the outer periphery of the head may be formed with a plurality of axially extending ribs or keys 15 which engage in corresponding notches in the inner periphery of the disks 13. At the right end of the head, as shown in Fig. 1, is an abutment disk 16 held against movement to the right as viewed in said figure by the flange 17. The disks are adapted to be forced into frictional engagement by a presser member 18 having a hub 19 slidably mounted on the driven shaft 20, this member being arranged at the opposite side of the head with respect to the abutment disk 16.

For the purpose of normally forcing the disks into engagement the web 20' of the clutch head is formed with a circular series of apertures 21 for the cup members 22. Each cup member has a peripheral flange 23 at one end bearing against the web 20' and at the opposite end the bottom of the cup is formed with a bore 24 for a spring bolt 25. One end of the bolt has a head 26 between which and the bottom of the cup is interposed a coiled spring 27 acting to force the bolt toward the right as viewed in Fig. 1. The opposite end of the bolt or pin is formed with a plurality of spaced ribs 28 which preferably are substantially semicircular in cross section, and the grooves 29 between the ribs are also substantially semicircular at their bottoms. A split nut comprising the sections 30 has its inner periphery formed with the annular ribs 31 and interposed grooves 32 adapted to fit on the corresponding end of the pin 25. The outer periphery 33 of the nut is conical and adapted to fit in the conical bore 34 formed in the presser member 18.

From the foregoing description it will be observed that when the split nuts are placed on the associated ends of the pins 25, the springs 27 acting against the heads of the pins will act to draw the nuts into the conical bores 34, thereby locking the nuts on the pins and holding the pins against axial movement under the influence of the springs. Furthermore, as the springs act at one end against the clutch head and at the other against the bolts the presser member 18 will always be under the influence of a force acting to move it toward the right as viewed in Fig. 1. Thus the clutch is normally held in engagement. It may be disengaged in any suitable manner. As shown, a pedal 35 is mounted on a pin 36 on the transmission casing 37 and has connection by means of a link 38 with an arm 39 secured to a rock shaft 40. This rock shaft has a pair of fingers 41 adapted to engage the thrust ring 42 carried by the hub 19 on the presser member. Thus when the pedal is depressed the presser member will be moved toward the left as viewed in Fig. , that is, in the direction to compress the springs 27 and relieve the disks of the clutch.

The means above described for connecting the pins 25 to the presser member provides a positive self-locking device for preventing movement of the bolts 25 and in addition it will be seen that this connection does not increase the axial length of the clutch as the nuts do not project at the left of the presser member as would the usual threaded nut connection. Furthermore, the nuts can be removed merely by compressing the springs 27, thus permitting the parts to be disassembled quickly.

Although a specific embodiment has been described, it is to be understood that the invention is not thus limited, but includes changes and modifications which come within the scope of the appended claims.

Having thus described the invention what is claimed as new and desired to be secured by Letters Patent is:

1. In a friction clutch, in combination, a driving part having a friction surface, a driven part having a friction surface adapted to be engaged with the first mentioned surface, and means to effect the engagement of said surfaces including a member secured for rotation with one of the parts and held against movement axially of the clutch, a second member mounted for rotation with said part and for movement axially of the clutch, a plurality of headed pins disposed in a circle concentric with the axis of the clutch, a spring between the head of each pin and one of said members, the other member having a plurality of conical apertures, the other ends of said pins having annular ribs, a split nut for each pin having corresponding interior annular ribs adapted to fit the grooves between the ribs of the pins and having an outer conical surface adapted to fit said conical apertures.

2. In a clutch, a driving disk, a driven disk, means to press the disks together including a disk presser formed with a plurality of conical apertures arranged in a circle concentric with the clutch axis, a plurality of pins each having a head at one end and a circular rib at the other, a split nut for each pin having an interior annular groove for said rib and a conical exterior surface adapted to fit in one of said apertures, and springs acting on the heads of said pins in the direction to draw the nuts into their apertures and the presser plate against the disks.

3. In a friction clutch, an axially movable member, an axially immovable member and means to yieldingly force the movable member toward the immovable member including a pin parallel to the axis having a head at one end and a circular rib at the other, a split nut having an interior groove receiving said rib and a conical exterior surface, one of said members formed with a conical aperture for said nut and a spring acting between the other of said members and said head to draw the nut into said aperture, whereby endwise movement of the pin relative to the last mentioned member is prevented, and the members are forced toward each other.

4. In a multiple disk clutch, a plurality of disks, a spider, a disk presser formed with a conical aperture, a pin having a head at one end and a plurality of shallow annular grooves at the other, a spring interposed between the head and spider, and a split nut formed with interior annular ribs fitting the grooves in the pin and having a conical peripheral surface disposed in said aperture, whereby the thrust of the spring locks the nut on the pin.

5. In a clutch, means to yieldingly effect the engagement of the parts thereof including a pin having an abutment at one end and a plurality of spaced circular ribs at the other substantially semi-circular in cross section, a split nut having interior grooves to receive said ribs and a conical outer surface, a member of the clutch formed with a conical aperture for said nut and a spring acting on said head in a direction to draw the nut into the aperture and the parts of the clutch together.

In testimony whereof I affix my signature.

JESSE G. VINCENT.